United States Patent
Kim et al.

(10) Patent No.: US 8,134,914 B2
(45) Date of Patent: Mar. 13, 2012

(54) SUBCARRIER ALLOCATION APPARATUS AND METHOD, SUBCARRIER DE-ALLOCATION APPARATUS AND METHOD IN OFDM SYSTEM

(75) Inventors: Jun-Woo Kim, Daejeon (KR); Su-Chang Chae, Daejeon (KR); Young-Ha Lee, Daejeon (KR); Eon-Young Hong, Daejeon (KR); Youn-Ok Park, Daejeon (KR)

(73) Assignees: Samsung Electronics Co., Ltd., Suwon-si (KR); Electronics and Telecommunications Research Institute, Daejeon-si (KR); KT Corporation, Seongnam-si (KR); SK Telecom Co., Ltd., Seoul (KR); KTFreetel Co., Ltd., Seoul (KR); Hanaro Telecom, Inc., Seoul (KR)

( * ) Notice: Subject to any disclaimer, the term of this patent is extended or adjusted under 35 U.S.C. 154(b) by 1311 days.

(21) Appl. No.: 11/721,136

(22) PCT Filed: Nov. 10, 2005

(86) PCT No.: PCT/KR2005/003807
§ 371 (c)(1),
(2), (4) Date: Jun. 7, 2007

(87) PCT Pub. No.: WO2006/062299
PCT Pub. Date: Jun. 15, 2006

(65) Prior Publication Data
US 2010/0061223 A1   Mar. 11, 2010

(30) Foreign Application Priority Data
Dec. 10, 2004   (KR) .................... 10-2004-0104461

(51) Int. Cl.
*H04J 11/00*   (2006.01)

(52) U.S. Cl. .................... 370/208; 370/203; 370/210
(58) Field of Classification Search .................. 370/252, 370/333, 343, 345, 203–210
See application file for complete search history.

(56) References Cited

U.S. PATENT DOCUMENTS
7,639,660 B2 * 12/2009 Kim et al. .............. 370/343
(Continued)

FOREIGN PATENT DOCUMENTS
KR   1020020056986 A   7/2002
KR   1020030075117 A   9/2003

OTHER PUBLICATIONS
Cheong Yui Wong, C, et al. A real-time sub-carrier allocation scheme for multiple access downlink OFDM transmission, pp. 1124-1128, 1999, IEEE.

*Primary Examiner* — Chuong T Ho
(74) *Attorney, Agent, or Firm* — Jefferson IP Law, LLP

(57) ABSTRACT

A subcarrier allocating apparatus allocating data to be transmitted to a plurality of orthogonal subcarriers in an orthogonal frequency division multiplexing (OFDM) system is provided. The apparatus includes a logical index generator generating a logical index for allocating a data subcarrier to a physical index, the logical index being included with only data subcarriers and the physical index indicating a location of a substantial subcarrier within a symbol, an intermediate index converter converting the logical index into an intermediate index by performing a given operation on the generated logical index and a pilot location constant, and a physical index converter converting the intermediate index into a physical index based on the number of data subcarriers on the left and right sides of a null subcarrier for insertion of a guard interval formed by the null subcarrier.

23 Claims, 9 Drawing Sheets

U.S. PATENT DOCUMENTS

| | | |
|---|---|---|
| 2004/0160892 A1* | 8/2004 | Agrawalla et al. ............ 370/203 |
| 2004/0174808 A1 | 9/2004 | Bolinth |
| 2004/0190640 A1 | 9/2004 | Dubuc et al. |
| 2004/0228283 A1* | 11/2004 | Naguib et al. ................ 370/252 |
| 2005/0201476 A1 | 9/2005 | Kim |
| 2006/0056540 A1* | 3/2006 | Magee .......................... 375/299 |
| 2006/0203935 A1* | 9/2006 | Li et al. ......................... 375/299 |
| 2011/0255572 A1* | 10/2011 | Giannakis et al. ............ 375/146 |

* cited by examiner

[Fig. 3]
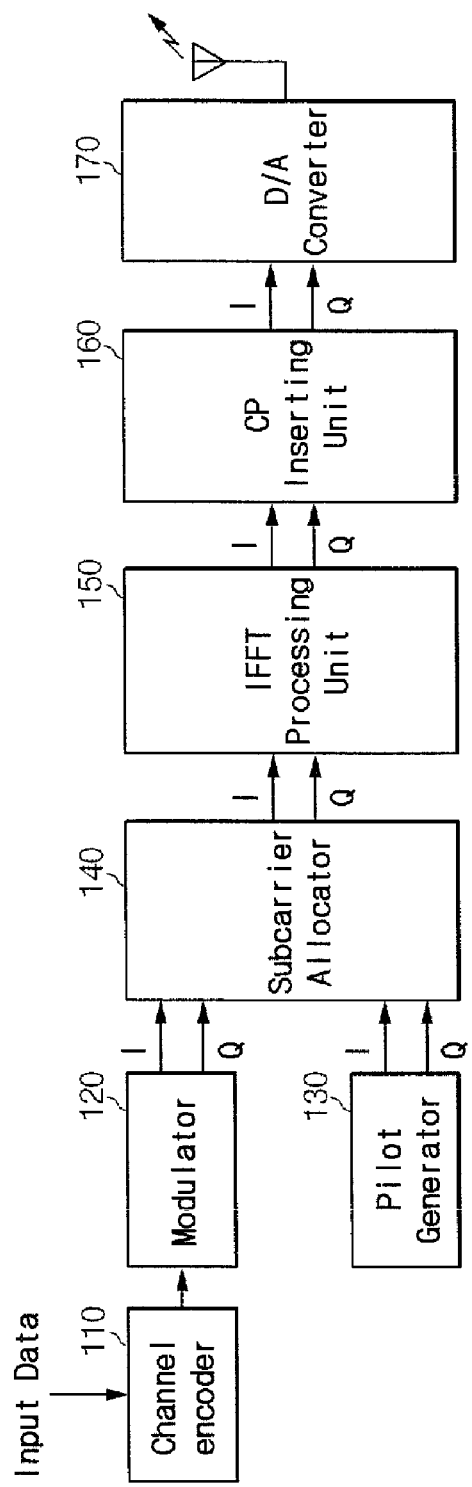

[Fig. 4]
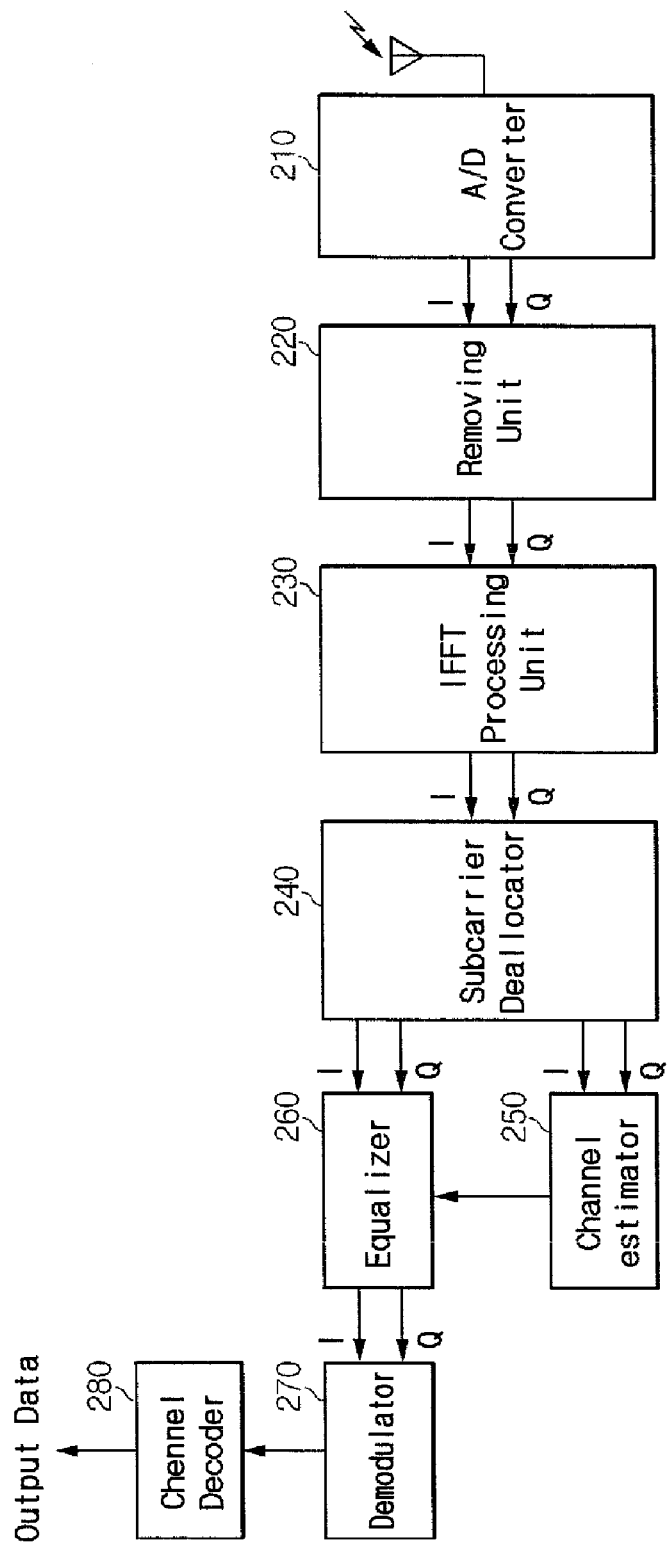

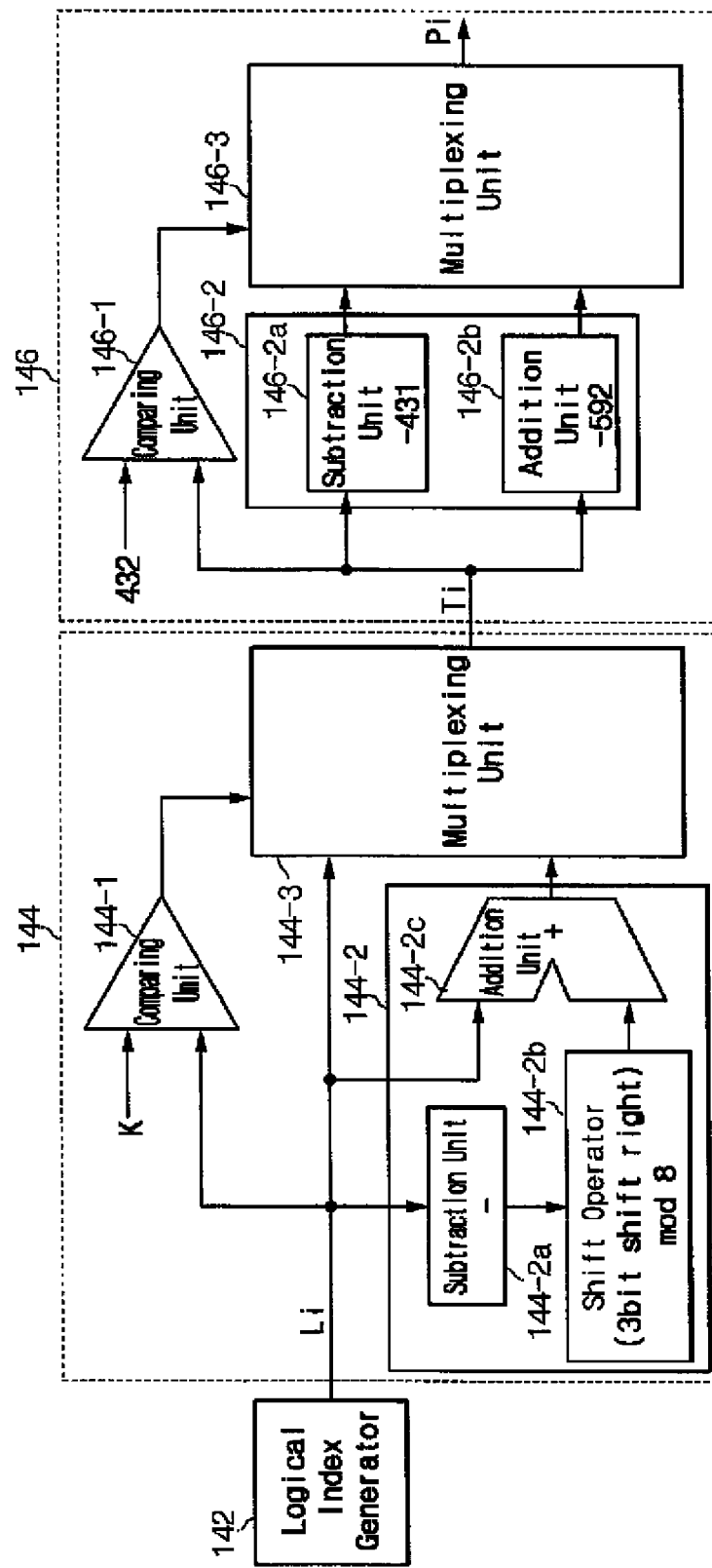
[Fig. 5]

[Fig. 6]
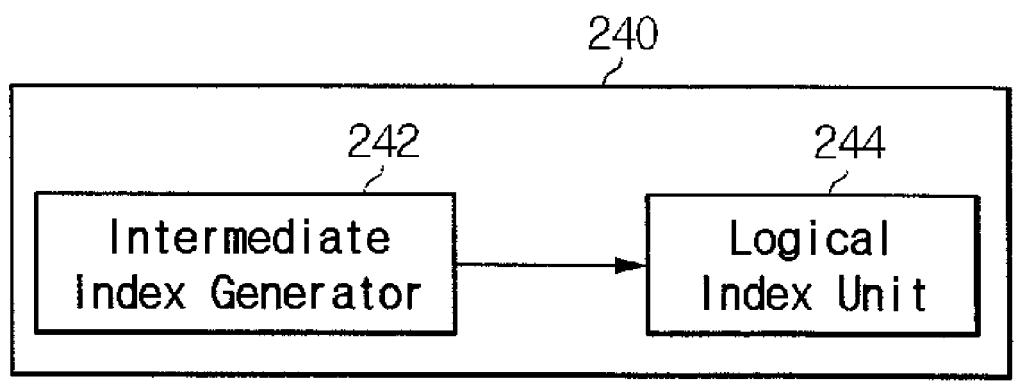

[Fig. 7]
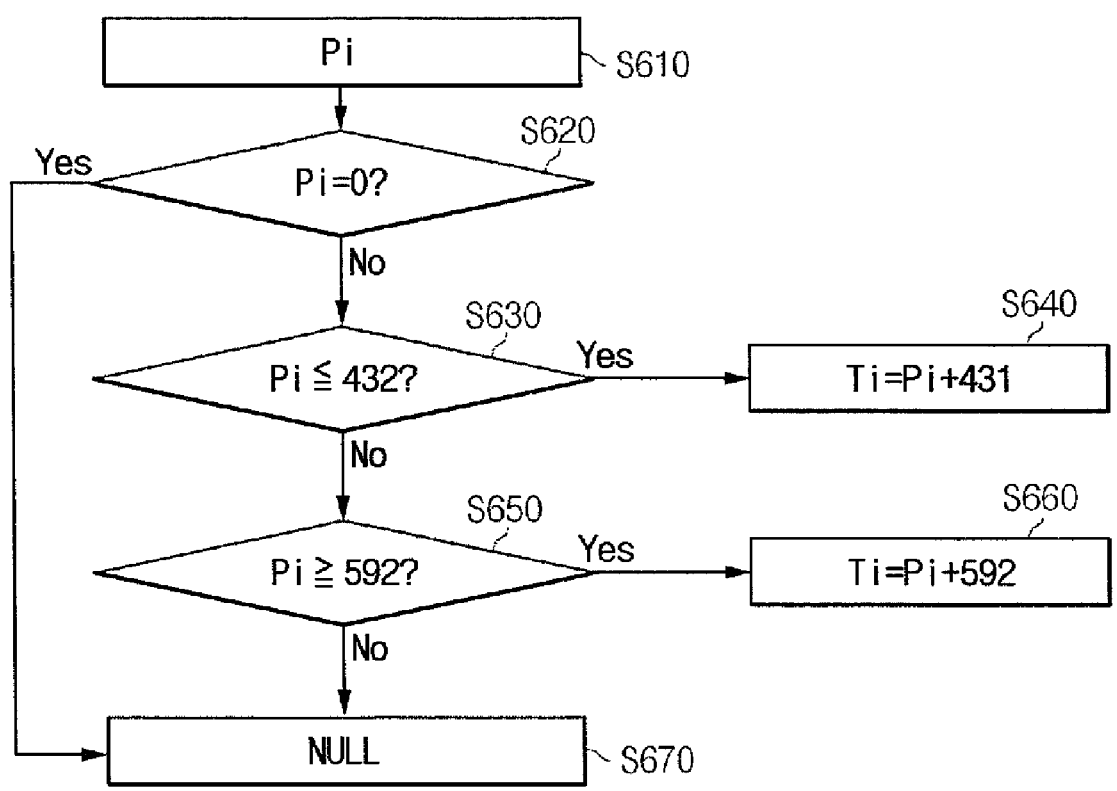

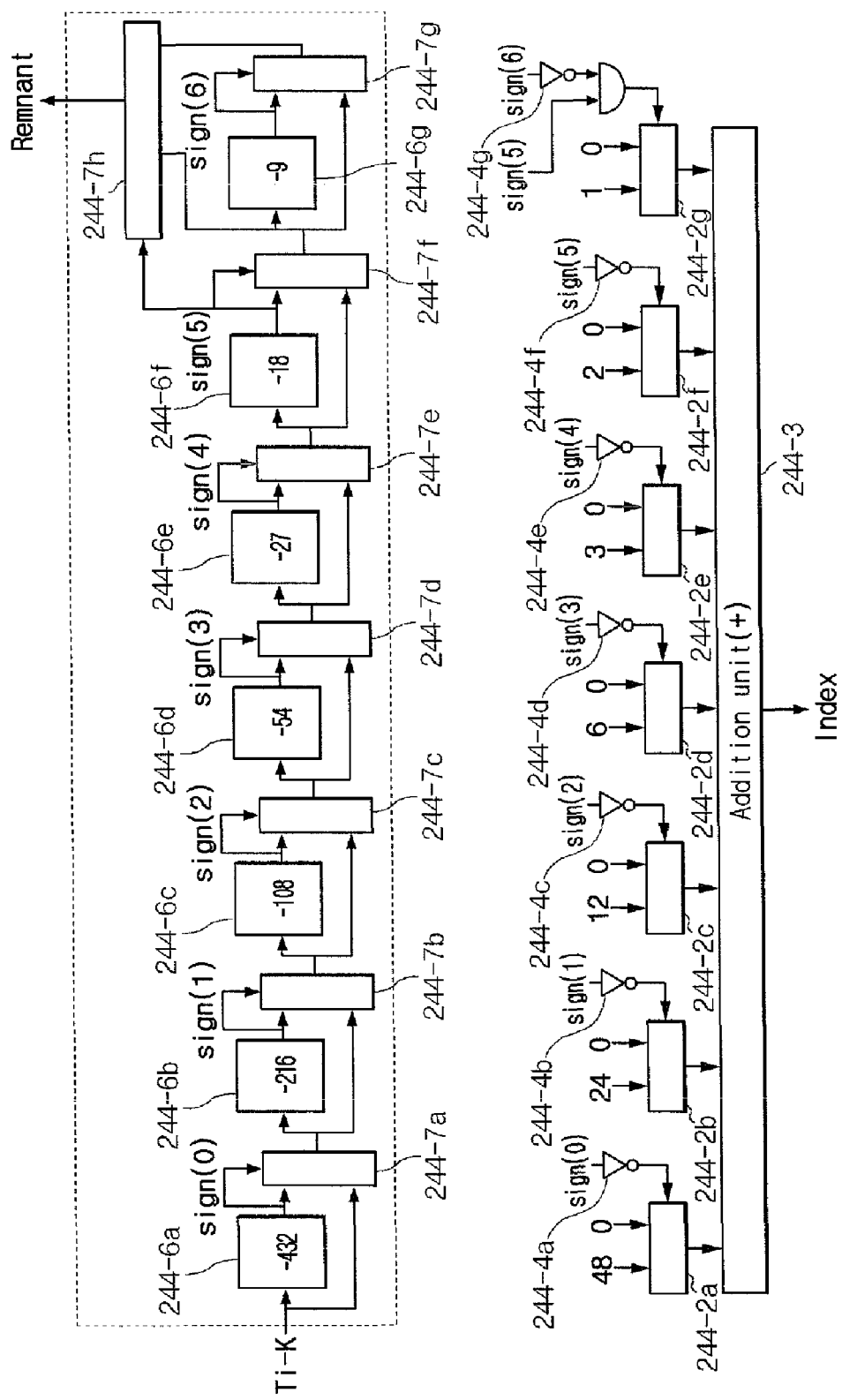
[Fig. 8]

[Fig. 9]
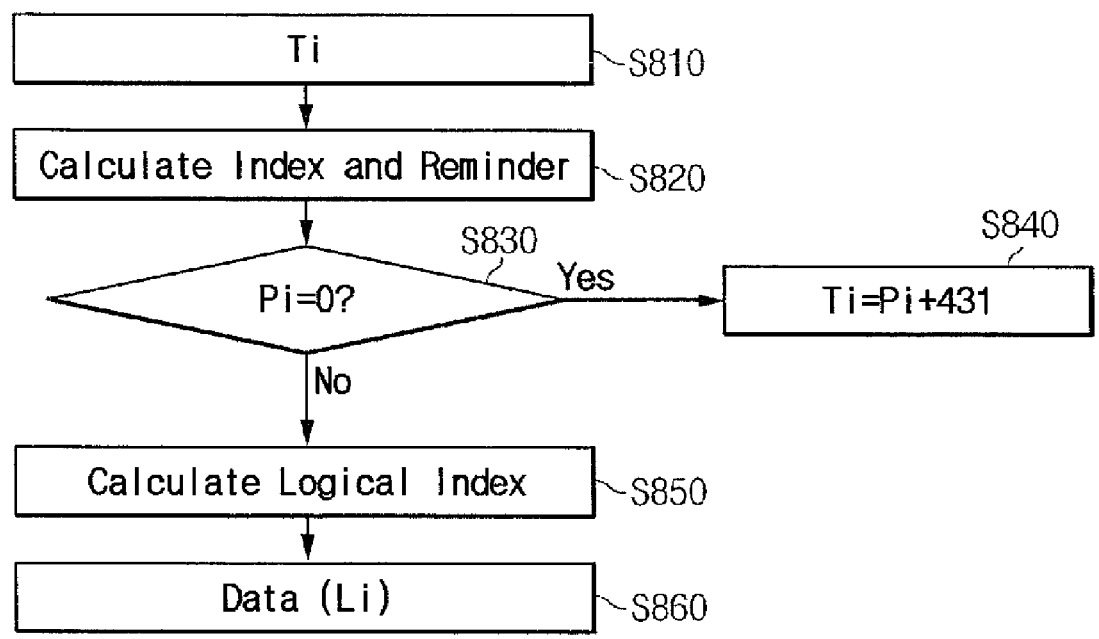

SUBCARRIER ALLOCATION APPARATUS AND METHOD, SUBCARRIER DE-ALLOCATION APPARATUS AND METHOD IN OFDM SYSTEM

TECHNICAL FIELD

The present invention relates to an Orthogonal Frequency Division Multiplexing (OFDM) system, and more particularly, the present invention relates to a subcarrier allocating/de-allocating apparatus and a method thereof for allocating data to a substantial subcarrier in a symbol and de-allocating the data with ease to thereby simplify channel estimation when scattered pilots are included in the symbol in an OFDM system.

BACKGROUND ART

In order to implement a broadband multimedia wireless service system with a reliable high speed and large capacity, OFDM transmission methods for transmitting signals with high data rates in millimeter wave bandwidths from several to several tens of GHz have been used.

The OFDM method of transmitting a data row on a subcarrier at a lower data transmission rate is the most adequate modulation method for high-rate data transmission at present. However, in a wireless communication channel environment, radio signals are reflected off objects, such as walls, buildings, mountains, etc., causing multipath. A multipath radio channel may cause delay spread. Further, it may cause inter symbol interference (ISI) when the length of the delay spread is greater than a time taken for transmitting the next symbol. The multipath delay spread causes frequency-selective fading in the frequency domain, and an equalizer is used to eliminate ISI components when the system uses a single-carrier. However, the equalizer becomes more complex as data transmission speed increases. Therefore, data are processed in parallel by transmitting a high rate data stream in parallel on a plurality of subcarriers such that the high-rate data stream is split into a number of lower rate streams, which are then simultaneously transmitted on a number of subcarriers in the OFDM system. As described, the ISI is reduced when using low-rate parallel carriers because a symbol interval becomes longer, and the ISI can be almost completely eliminated by using a guard interval. In addition, a further merit of the OFDM system is that the OFDM system is strong against frequency selective fading because it uses multiple carriers.

FIG. 1 shows locations of pilot subcarriers and data subcarriers within each symbol when a scattered pilot is distributed throughout the symbols in an OFDM system, wherein the scattered pilot changes locations from symbol to symbol.

As shown in FIG. 1, each of the OFDM symbols includes a null subcarrier, a pilot subcarrier, and a data subcarrier. The null subcarrier composes a guard interval together with a zero indexed DC, and the pilot subcarrier is used for channel estimation. The data subcarrier fills the remainder of the OFDM symbol.

In the OFDM system, each pilot subcarrier is spaced by 9 subcarriers within a symbol, and then spaced by 3 subcarriers in the next symbol. Thus, a predetermined number of data subcarriers are allocated to the respective symbols. However, a location of the data subcarriers in the symbol may vary depending on a symbol number as shown in FIG. 1.

For example, data subcarrier 0 is mapped to subcarrier 1 in every symbol. However, data subcarrier 1 is mapped to subcarrier 2 in the first and second symbols, and mapped to subcarrier 3 in the third symbol. Therefore, a mapping logic is required to locate data subcarriers on actual subcarriers within a symbol. Herein, an index formed only by the data subcarriers is called a logical index, and the substantial subcarrier location within the symbol is called a physical index.

A simple method for mapping the logical index to the physical index using a Read Only Memory (ROM) table is shown in FIG. 2.

FIG. 2 shows the arrangement of data, pilot, and null subcarriers, with the existence of scattered pilots, in a conventional OFDM system.

As shown in FIG. 2, a result of a fast Fourier transform (FFT) processing unit 10 of a demodulator is classified as a null subcarrier, a data subcarrier, and a pilot subcarrier. The null subcarrier is discarded, and the data subcarrier and the pilot subcarrier are stored in a data buffer 22 and a pilot buffer 24 in an FFT buffer 20, respectively. At this point, a subcarrier mapping ROM table 30 determines whether to discard a subcarrier or to store it in either the data buffer 22 or the pilot buffer 24 according to a physical index output from the FFT processing unit 10.

Thus, the subcarrier mapping ROM table 30 stores information on a subcarrier corresponding to a physical index output from the FFT processing unit 10. The information contains a type and an address of the subcarrier.

The channel estimator 40 estimates channel characteristics of the corresponding subcarrier and its adjacent subcarrier using pilot subcarriers stored in the pilot buffer 24, and the equalizer 50 equalizes data subcarriers with reference to the channel characteristics. The QAM demodulator 60 outputs data to be transmitted to a channel decoder. Then the channel decoder demodulates desired data by performing channel decoding.

However, the size of the subcarrier mapping ROM table 30 becomes increased when locations of the pilot subcarriers change from symbol to symbol as shown in FIG. 1. That is, when scattered pilots are included in the symbols, the number of pilot subcarriers included in the symbols increases and accordingly, the size of the FFT processing unit 10 increases. Thus, it is inefficient to use the subcarrier mapping ROM table 30.

The above information disclosed in this Background of the Invention section is only for enhancement of understanding of the background of the invention and therefore, it should not be understood that all the above information forms the prior art that is already known in this country to a person of ordinary skill in the art.

DISCLOSURE OF INVENTION

Technical Problem

The present invention has been made in an effort to provide a subcarrier allocating apparatus and a method thereof having advantages of allocating data to a substantial subcarrier within a symbol when scattered pilots are included in the symbol in an orthogonal frequency multiplexing (OFDM) system.

In addition, the present invention is also purposed to provide a subcarrier de-allocating apparatus and a method thereof having advantages of performing channel estimation with ease by distinguishing subcarriers allocated to the subcarriers by the subcarrier allocating apparatus.

Technical Solution

In one aspect of the present invention, there is provided a subcarrier allocating apparatus allocating data to be transmitted to a plurality of orthogonal subcarriers in an orthogonal frequency division multiplexing (OFDM) system. The apparatus includes a logical index generator, an intermediate index converter, and a physical index converter. The logical index generator generates a logical index for allocating a data subcarrier to a physical index, the logical index being included with only data subcarriers and the physical index indicating a location of a substantial subcarrier within a symbol. The intermediate index converter converts the logical index into an intermediate index by performing a given operation on the generated logical index and a pilot location constant. The physical index converter converts the intermediate index into a physical index based on the number of data subcarriers on the left and right sides of a null subcarrier for insertion of a guard interval formed by the null subcarrier.

The given operation may be an operation for calculating a quotient of dividing by 8.

The physical index converter may allocate pilot subcarriers with regular intervals with respect to the time axis and the frequency axis.

In another aspect of the present invention, there is provided a method for allocating data to be transmitted to a plurality of orthogonal subcarriers in an orthogonal frequency division multiplexing (OFDM) system. The method includes a) generating a logical index for allocating the data to be transmitted to a physical index according to the logical index, the logical index being included with only data subcarriers; b) converting the generated logical index into an intermediate index by performing a given operation; and c) converting the intermediate index into a physical index by performing a given operation for insertion of a null subcarrier due to inter symbol interference (ISI), the null subcarrier being inserted as a guard interval and the physical index indicating a location of a substantial subcarrier within a symbol.

In another aspect of the present invention, there is provided a subcarrier de-allocating apparatus de-allocating data allocated to a plurality of subcarriers in an orthogonal frequency division multiplexing (OFDM) system. The subcarrier de-allocating apparatus includes an intermediate index generator and a logical index unit. The intermediate index generator generates an intermediate index by removing null subcarriers used as a guard interval from a current physical index, the physical index indicating a location of a substantial subcarrier within a symbol. The logical index unit obtains a substantial logical index by distinguishing a data subcarrier and a pilot subcarrier through a given operation, the logical index being included with only data subcarriers. The given operation may be an operation that divides a result of subtracting a pilot location constant from the intermediate index by 9. The logical index unit may distinguish the data subcarrier and the pilot subcarrier based on a remainder of the division by 9, and the logical index unit may distinguish the order of the pilot subcarrier based on a quotient of the division by 9 when a current subcarrier is a pilot subcarrier.

ADVANTAGEOUS EFFECTS

According to the present invention, the type of a subcarrier and its order may be identified from a received subcarrier without using a ROM table when scattered pilots that change location from symbol to symbol are distributed through a symbol in the OFDM system. Accordingly, hardware size is reduced since a large-capacity ROM table is not needed.

BRIEF DESCRIPTION OF THE DRAWINGS

FIG. 3 and FIG. 4 respectively illustrate a transmitting apparatus and a receiving apparatus of an OFDM system according to an embodiment of the present invention.

FIG. 5 shows a structure of a subcarrier allocator of FIG. 3.

FIG. 6 schematically shows a structure of a subcarrier de-allocator of FIG. 4.

FIG. 7 is a flowchart showing an operation process of an intermediate index generator of FIG. 6.

FIG. 8 and FIG. 9 respectively show an operation process of a logical index of FIG. 6.

BEST MODE FOR CARRYING OUT THE INVENTION

Figure 1:
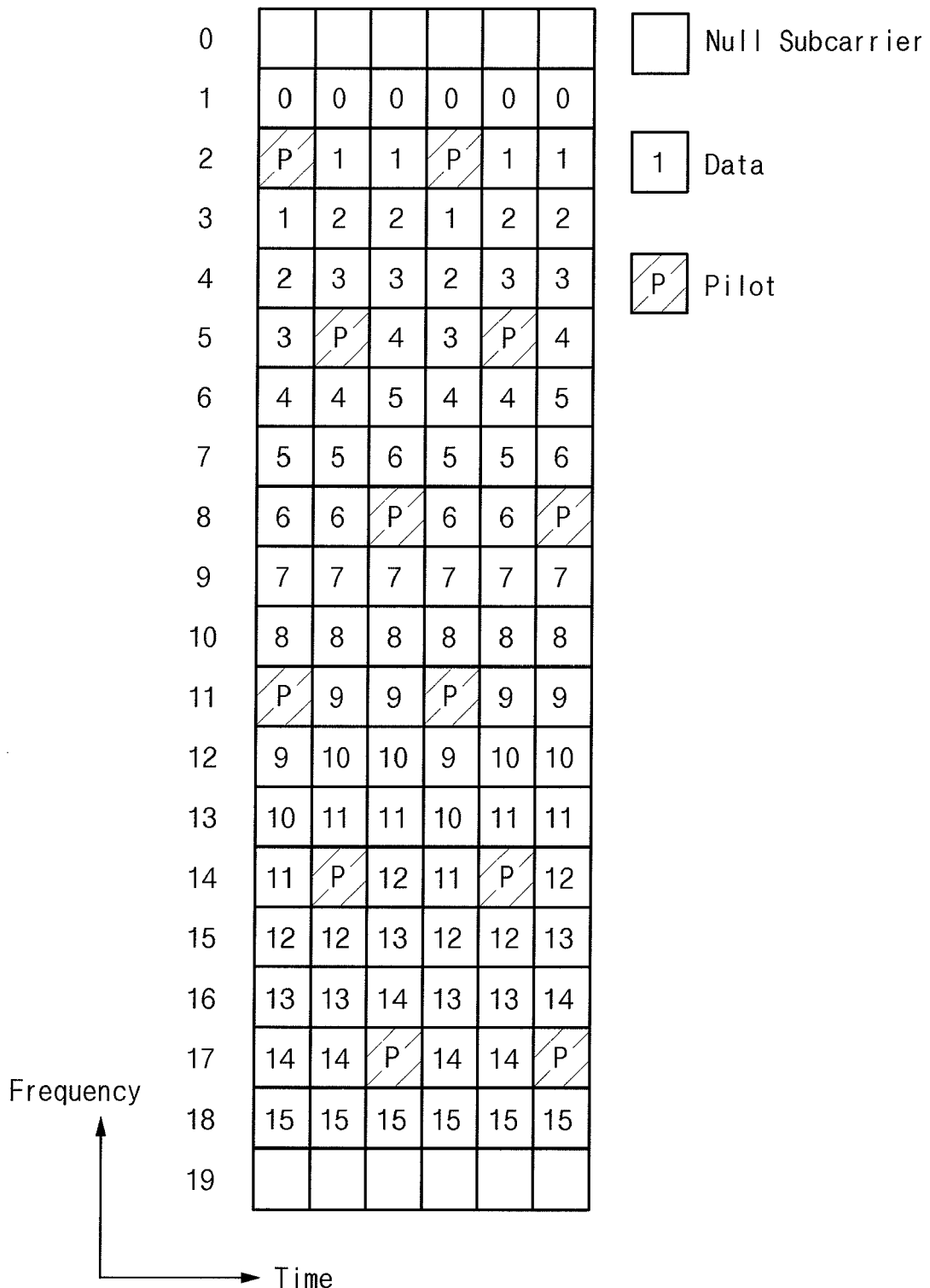
FIG. 1 shows locations of pilot subcarriers and data subcarriers within each symbol when scattered pilots, which change locations from symbol to symbol, are distributed throughout the symbols in an OFDM system.
Figure 2:
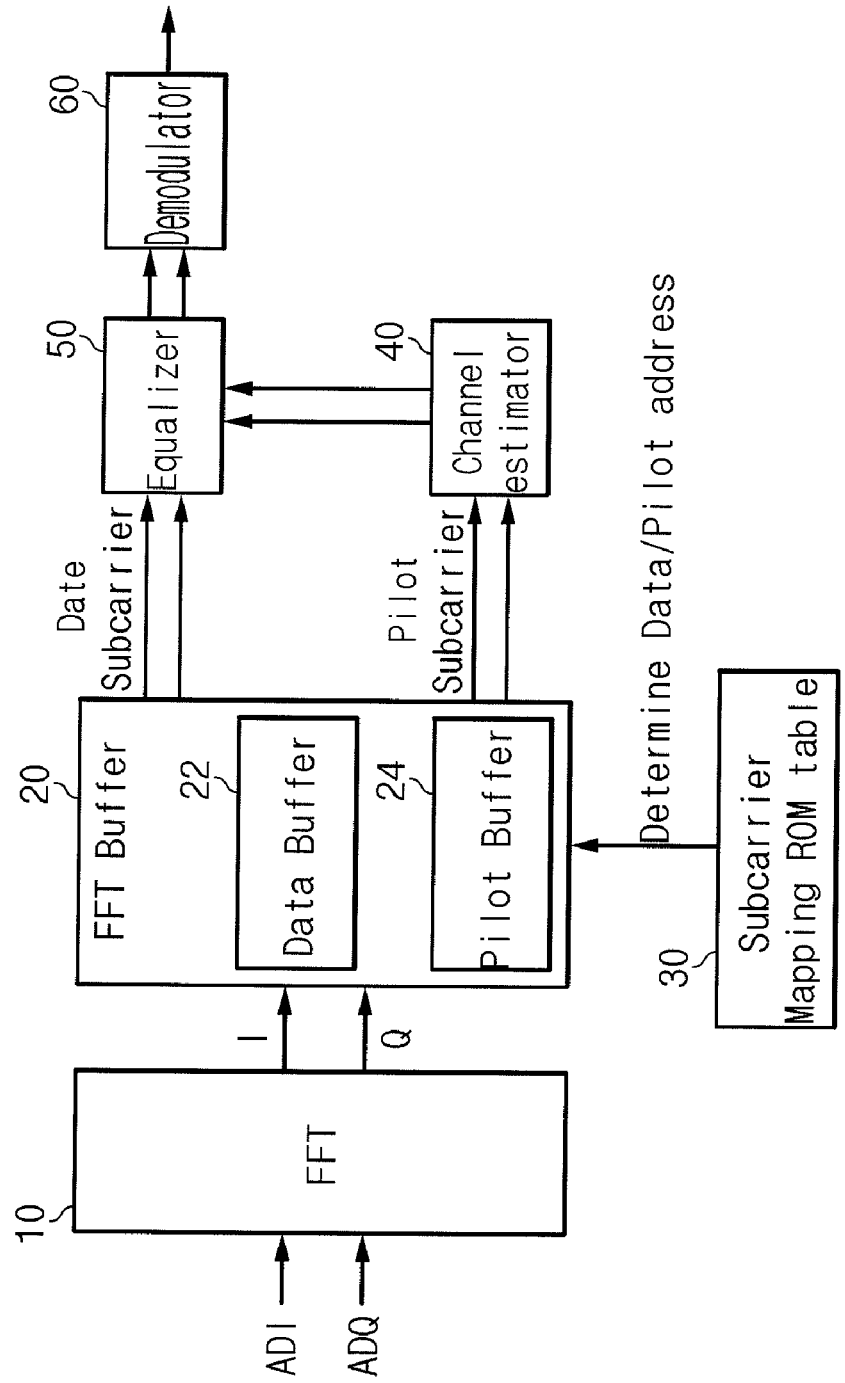
FIG. 2 shows allocation of a data subcarrier, a pilot subcarrier, and a null subcarrier when a scattered pilot is distributed in a conventional OFDM system.

An embodiment of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

A subcarrier allocation apparatus and a method thereof, and a subcarrier de-allocation apparatus and a method thereof, in an orthogonal frequency division multiplexing (OFDM) system according to an exemplary embodiment of the present invention will be described in more detail with reference to the accompanying drawings.

An OFDM system according to an embodiment of the present invention will now be described in more detail with reference to FIG. 3 and FIG. 4.

FIG. 3 and FIG. 4 respectively illustrate a transmitting apparatus and a receiving apparatus of the OFDM system according to the embodiment of the present invention.

As shown in FIG. 3, the transmitting apparatus includes a channel encoder 110, a modulator 120, a pilot generator 130, a subcarrier allocator 140, an inverse fast Fourier transform (IFFT) processing unit 150, a cyclic prefix (CP) inserting unit 160, and a digital to analog (D/A) converter 170.

The channel encoder 110 performs channel coding on data to be transmitted so that the data tolerates noise and attenuation introduced by a channel through which the data is transmitted due to signal conversion.

The modulator 120 generates data subcarriers by mapping the channel coded data according to a given modulation scheme. The IEEE802.11a standard defined 4 types of modulation methods: Binary Phase Shift Keying (BPSK) (1-bit data transmission per symbol), Quaternary Phase Shift Keying (QPSK) (2-bit per symbol), 16 symbols Quadrature Amplitude Modulation (16QAM) (4-bit per symbol), and 64 symbols Quadrature Amplitude Modulation (64QAM) (6-bit per symbol). QAM mapping is typically used for modulation.

The pilot generator 130 transmits a pilot signal, which is known at the transmitting and receiving sides, on a subcarrier, and the quality of the channel estimation depends on the degree of phase distortion of the subcarrier on the channel. At this point, the number of pilot subcarriers is determined depending on delay spread, a modulation scheme, and delay spread estimation according to a channel condition.

The subcarrier allocator 140 receives the data subcarriers and pilot subcarriers, and allocates them on an actual subcarrier within a symbol. The subcarrier allocation is purposed to obtain a frequency diversity effect by spreading subcarriers allocated to a specific user in a frequency band.

The IFFT processing unit 150 performs IFFT on the data and pilot subcarriers allocated by the subcarrier allocator 140, loads the IFFT processed data and pilot subcarriers on different orthogonal subcarriers in the frequency domain, and converts the subcarriers into signals in the time domain for actual transmission. At this point, data output from the IFFT processing unit 150 is called an OFDM symbol.

The CP inserting unit 160 inserts a guard interval with a length longer than a maximum delay spread of a channel between an OFDM symbol and its adjacent OFDM symbol in order to prevent inter OFDM symbol interference (ISI). Thus, a signal transmission period corresponds to combinations of an effective symbol period for actual data transmission and the guard interval period. The receiving apparatus removes the guard symbol, receives data during the effective symbol period, and performs demodulation on the data. A cyclic prefix (CP) is inserted in the guard interval to prevent having orthogonally different subcarriers due to a subchannel delay, wherein the CP is a replica of the last part of an effective symbol period.

The D/A converter 170 converts the OFDM symbol in which the CP is additionally inserted into an analog OFDM symbol, and transmits the analog OFDM symbol to the receiving apparatus through a radio frequency (RF) terminal.

As shown in FIG. 4, the receiving apparatus of the OFDM system includes an A/D converter 210, a CP remover 220, a FFT processing unit 230, a subcarrier de-allocator 240, a channel estimating unit 250, an equalizer 260, a demodulator 270, and a channel decoder 280.

The A/D converter 210 converts the analog OFDM symbol from the RF terminal into a digital OFDM symbol.

The CP remover 220 detects a synchronization signal of the OFDM symbol within a frame, restores a FFT window by searching for the start of the frame, and then restores a fine frequency of the OFDM symbol from the detected synchronization signal. The CP remover 220 removes the guard interval period (i.e., the CP) from the OFDM symbol where frame synchronization is detected and the fine frequency is restored.

The FFT processing unit 230 performs FFT on the OFDM symbol from which the guard interval is removed, and converts an output signal in the time domain into a signal in the frequency domain. At this point, data subcarriers and pilot subcarriers are combined in the signal.

The subcarrier de-allocator 240 extracts a desired data subcarrier and a necessary pilot subcarrier for channel estimation from the FFT processed signal.

The channel detector 250 performs the channel estimation using the pilot subcarrier by employing an interpolation method or an extrapolation method.

The equalizer 260 equalizes data according to an estimated channel condition. At this point, the equalizer 260 compensates undesirable characteristics of the channel, such as noise, inter channel interference, and multipath channel distortion, etc.

The demodulator 270 performs demodulation by demapping the signal output from the equalizer 260.

The channel decoder 280 performs channel decoding on the demodulated signal in order to demodulate desired data.

A subcarrier allocation apparatus and a method for allocating a subcarrier in an orthogonal frequency division multiplexing (OFDM) system will now be described according to an exemplary embodiment of the present invention.

Pilot subcarriers are distributed with respect to a time axis and a frequency axis in regular intervals, as shown in FIG. 1, according to an embodiment of the present invention, and this is the most general distribution type for pilot subcarriers. As shown in FIG. 1, pilot subcarriers are separated by 9 subcarriers within a symbol and separated by 3 subcarriers in the next symbol in the OFDM system according to an exemplary embodiment of the present invention. An index included with only data subcarriers is called a logical index, and an index identifying locations of actual subcarriers in a symbol is called a physical index.

When pilot subcarriers are arranged as shown in FIG. 1, mapping a logical index in the first symbol into a physical index is given by Equation 1 according to an exemplary embodiment of the present invention. Here, as described above, an index included with only data subcarriers is called a logical index, and an index identifying locations of actual subcarriers in a symbol is called a physical index. A subcarrier with physical index 0 corresponds to a null subcarrier which is a DC in every symbol.

$$Pi = \begin{cases} Li + 1 & (Li = 0) \\ Li + 2 + [(Li - 1)\text{mod}8] & (Li > 0) \end{cases} \quad \text{MathFigure 1}$$

where Pi denotes a physical index, Li denotes a logical index, and mod 8 is an operation that divides a given value by 8 and gives a quotient. When mod 8 is implemented in hardware, the quotient becomes high-order bits of the Li, excluding the three least significant bits.

Similar to the above, mapping in the second and third symbols is as given by

Equation 2 and Equation 3, respectively. The mapping in the first, second, and third symbols is periodically iterated from the fourth symbol such that subcarriers are allocated.

$$Pi = \begin{cases} Li + 1 & (Li < 4) \\ Li + 2 + [(Li - 4)\text{mod}8] & (Li \geq 4) \end{cases} \quad \text{MathFigure 2}$$

$$Pi = \begin{cases} Li + 1 & (Li < 4) \\ Li + 2 + [(Li - 4)\text{mod}8] & (Li \geq 4) \end{cases} \quad \text{MathFigure 3}$$

Meanwhile, the following Equation 4 represents Equation 1, Equation 2, and Equation 3 in one equation.

$$Pi = \begin{cases} Li + 1 & (Li < K) \\ Li + 2 + [(Li - K)\text{mod}8] & (Li \geq K) \end{cases} \quad \text{MathFigure 4}$$

$$K = \begin{cases} 1 & (\text{Symbol \#1}) \\ 4 & (\text{Symbol \#2}) \\ 7 & (\text{Symbol \#3}) \end{cases}$$

Substantially, a signal input to the IFFT processing unit 150 includes a plurality of null subcarriers as a guard interval, and thus parameters in Equation 4 may be changed before and after the null subcarriers.

For example, when the data and pilot subcarriers are arranged as shown in FIG. 5 in a system using a 1K IFFT, mapping the logical index to the physical index may be given as Equation 6.

$$Pi = \begin{cases} DC & i = 0 \\ \text{Pilot} + \text{Data}(432 \leq Li \leq 863) & 1 \leq i \leq 432 \\ \text{Null} & 432 \leq i \leq 591 \\ \text{Pilot} + \text{Data}(0 \leq Li \leq 431) & 592 \leq i \leq 1023 \end{cases} \quad \text{MathFigure 5}$$

$$Ti = \begin{cases} Li & (Li < K) \\ Li + 1 + [(Li - K)\text{mod}8] & (Li \geq K) \end{cases} \quad \text{MathFigure 6}$$

$$Pi = \begin{cases} Ti - 431 & (Ti \geq 432) \\ Ti + 592 & (Ti < 432) \end{cases}$$

$$K = \begin{cases} 1 & (\text{Symbol \#1}) \\ 4 & (\text{Symbol \#2}) \\ 7 & (\text{Symbol \#3}) \end{cases}$$

The subcarrier allocator 140 allocating a logical index to a physical index according to Equation 6 will now be described in more detail with reference to FIG. 5. In Equation 6, a value to be added or subtracted may vary depending on the characteristics of a system.

FIG. 5 shows a structure of the subcarrier allocator of FIG. 3.

As shown in FIG. 5, the subcarrier allocator 140 includes a logical index generator 142, an intermediate index converter 144, and a physical index converter 146.

The logical index generator 142 generates a logical index such that a subcarrier is allocated to a physical index according to the logical index.

The intermediate index converter 144 includes a comparing unit 144-1, a mapping unit 144-2, and a multiplexing unit 114-3.

The comparing unit 144-1 compares the logical index with a location constant K of a pilot subcarrier in order to allocate a data subcarrier to a physical index according to the logical index.

The mapping unit 144-2 includes a subtraction unit 144-2a, a shift operator 144-2b, and an addition unit 144-2c, and generates an intermediate index from the logical index through subtraction, division, and addition as shown in FIG. 4. The subtraction unit 144-2a subtracts the pilot location constant K from the logical index. The shift operator 144-2b performs division on a result of subtracting the pilot location constant from the logical index. At this point, the shift operator performs mod 8 to obtain a quotient of dividing by 8, and this can be simply implemented by discarding low-order bits. The addition unit 144-2c generates an intermediate index by adding the logical index and a result calculated by the shift operator 144-2b.

The multiplexing unit 114-3 selects an intermediate index Ti according to a comparison result of the comparing unit 144-1. At this point, the multiplexing unit 114-3 uses the logical index as the intermediate index when the logical index is smaller than the pilot location constant K. If the logical index is greater than the pilot location constant K, the multiplexing unit 114-3 uses an intermediate index obtained by the mapping unit 114-2.

The physical index converter 146 includes a comparing unit 146-1, a mapping unit 146-2, and a multiplexing unit 146-3.

The comparing unit 146-1 compares the number of data subcarriers the IFFF processing unit 150 allocates to left and right sides of the null subcarrier and the intermediate index output from the multiplexing unit 114-3.

The mapping unit 146-2 includes a subtraction unit 146-2a and an addition unit 146-2b, and generates a physical index through subtraction and addition as shown in Equation 6. The subtraction unit 146-2a generates a physical index from a result of subtracting 431 from the intermediate index, and the addition unit 146-2b generates a physical index from a result of adding 592 to the intermediate index.

The multiplexing unit 146-3 uses the physical index generated by the subtraction unit 146-2a or the addition unit 146-2b depending on a comparison result of the comparing unit 146-1. At this point, as shown in Equation 6, the multiplexing unit 146-3 uses the physical index generated by the subtraction unit 146-2a when the intermediate index is greater than the number of data subcarriers (432) allocated to the left and fight sides of the null subcarrier. If the logical index is smaller than the number of data subcarriers (432), the multiplexing unit 146-3 uses the physical index generated by the addition unit 146-2b.

Pilot subcarrier allocation is the same as shown in Equation 7.

$$Pilot_i = K + 1(8 \times i) \quad \text{MathFigure 7}$$

$$Pi = \begin{cases} Pilot_i - 431 & (Pilot_i \geq 432) \\ Pilot_i + 592 & (Pilot_i < 432) \end{cases}$$

$$K = \begin{cases} 1 & (\text{Symbol \#1}) \\ 4 & (\text{Symbol \#2}) \\ 7 & (\text{Symbol \#3}) \end{cases}$$

As described, allocated data which is to be transmitted is transmitted on a subcarrier, input to the RF terminal, and transmitted to a channel. A signal received through the channel is converted into a baseband signal and demodulated.

A subcarrier allocation apparatus and a method for allocating a subcarrier in an OFDM system according to an exemplary embodiment of the present invention will now be described in more detail with reference to FIG. 6 to FIG. 9.

The subcarrier de-allocator 240 searches a data subcarrier from a signal received at the receiving apparatus by performing Equation 6 in reverse order. However, the mod operation used in Equation 6 is irreversible. Therefore, an equation for identifying data subcarriers may be given as Equation 8. Herein, locations of null subcarriers are not taken account in this equation, and rem 9 represents an operation calculating a remainder of dividing by 9.

$$Ti = \begin{cases} Pi + 431 & (Pi \leq 432) \\ Pi - 592 & (Pi \geq 592) \end{cases} \quad \text{MathFigure 8}$$

$$Li = \begin{cases} Ti & (Ti < K) \\ Ti - 1 - [(Ti - K)\text{mod}9] & (Ti > K) \end{cases}$$

$$\text{Pilot\_index} = [(Ti - K)\text{mod}9] \; ([Ti - K]\text{rem}9 = 0)$$

FIG. 6 schematically shows a configuration of the subcarrier de-allocator of FIG. 4.

As shown in FIG. 6, the subcarrier de-allocator 240 includes an intermediate index generator 242 and a logical index unit 244.

The intermediate index generator 242 generates an intermediate index by removing null subcarriers from a current physical index.

The logical index unit 244 figures out whether a current subcarrier is a data subcarrier or a pilot subcarrier by performing mod 9 on the intermediate index and a pilot location constant such that a substantial logical index is obtained.

An operation of the intermediate index generator 242 will now be described in more detail with reference to FIG. 7. FIG. 7 shows an operating process of the intermediate index generator 242 of FIG. 6.

As shown in FIG. 7, the intermediate index generator 242 checks whether a value of a current physical index Pi is 0 in step S610 and step S620. If it is 0, the physical index Pi is identified as a null subcarrier in step S670. If it is not 0, the physical index Pi is identified whether it is a null subcarrier or an effective subcarrier by performing two comparison processes through steps S630 through S650.

The above process performed by the intermediate index generator 242 is the same as an inversed process of the physical index converter 146 converting the intermediate index into a physical index. Thus, a detailed description related to the configuration of the index generator 242 will not be provided since it is the same as that of the physical index converter 146.

The logical index unit 244 performs a given operation on an intermediate index Ti generated by the intermediate index generator 242 and a pilot location constant to thereby obtain an actual logical index Li from the intermediate index Ti. At this point, the logical index unit 244 obtains the logical index by performing mod 9 on a result of subtracting the pilot location constant K from the intermediate index Ti. Implementation of (Ti−K) mod in hardware may be given as Equation 9. Herein, an operation such as Equation 9 is required because the logical index may be changed depending on the number of pilot subcarriers on the right and left sides of a data subcarrier to be processed through index conversion.

$$(Ti-K) \bmod 9 = \text{not}[\text{sign}(0)] \times 48 + \text{not}[\text{sign}(1)] \times 24 + \text{not}[\text{sign}(2)] \times 12 + \text{not}[\text{sign}(3)] \times 6 + \text{not}[\text{sign}(4)] \times 3 + \text{not}[\text{sign}(5)] \times 2 + \text{sign}(5) \times \text{not}[\text{sign}(6)]$$

MathFigure 9

Configuration and operation of the logical index unit 244 for implementation of Equation 9 will now be described in more detail with reference to FIG. 8 and FIG. 9.

FIG. 8 and FIG. 9 show an operation flow of the logical index unit of FIG. 6.

A shown in FIG. 8, the logical index unit 244 includes a pilot subcarrier determining unit 244-1, a multiplexer 244-2, and an addition unit 244-3.

Multiplications in Equation 9 are respectively implemented by multiplexers 244-2a to 422-2g. The number of sign values used for the multiplexers 244-2a to 422-2g in Equation 9 is 7 because there are 96 pilot subcarriers distributed within a symbol when pilot subcarriers are spaced by 9 subcarriers as shown in FIG. 1 and 1K FFT is used. Output values of the respective multiplexers 244-2a to 422-2g are added by the addition unit 244-3.

At this point, sign values input to the multiplexers 244-2a to 422-2f are inverted as shown in Equation 9, and thus the respective multiplexers use inverters 244-4a to 244-4f to invert the sign values. For the operation of the last part that is sign 5×not[sign 6] in Equation 9, an inverter 244-4g and an AND gate 244-5 are used to invert the sign value to be input to the multiplexer 422-2g.

The sign values used for Equation 9 imply the number of pilot subcarriers on the left and right sides of a data subcarrier to be converted into a logical index, and the pilot carrier determining unit 244-1 determines each sign value. Herein, a comparator 244-6a compares whether the number of effective subcarriers, which is 864 in this instance, is greater than 432, and a selection unit 244-7a determines the first sign value (sign 0) according to a comparison result. A selecting unit 244-7a selects a positive value among two results input to the selecting unit 244-7a and the positive value is compared with 216 by a comparator 244-6b. A selection unit 244-7b then determines the second sign value (sign 1) according to the comparison result. In a like manner as described above, a plurality of comparators 244-6c to 244-6g and a plurality of selection units 244-7c to 244-7g determine the first sign value (sign 0) to the seventh sign value (sign 7). In this operation, since division of 27 by 2 has a remainder, a selecting unit 244-7h is provided for complex computation.

As shown in FIG. 9, the logical index unit 244 checks whether a remainder of dividing (Ti−K) by 9 is 0 to identify whether a current subcarrier is a data subcarrier or a pilot subcarrier in steps S810 to S830. If the remainder is 0, the current subcarrier is identified as a pilot subcarrier in step S840. Otherwise, the current subcarrier is identified as a data subcarrier in step S850 and step S860. The remainder is applied to Equation 9 as a value of the Remnant of FIG. 8.

When the current subcarrier is identified as a pilot subcarrier, a quotient of dividing (Ti−K) by 9 indicates order of the pilot.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A subcarrier allocating apparatus allocating data to be transmitted to a plurality of orthogonal subcarriers in an orthogonal frequency division multiplexing (OFDM) system, the apparatus comprising:
    a logical index generator generating a logical index for mapping a data subcarrier, the logical index being formed by data subcarriers only;
    an intermediate index converter converting the logical index into an intermediate index by performing a given operation on the generated logical index and a pilot location constant; and
    a physical index converter converting the intermediate index into a physical index based on a number of data subcarriers on left and right sides of a null subcarrier for insertion of the null subcarrier corresponding to a guard interval, the physical index indicating a location of a substantial subcarrier within a symbol.

2. The subcarrier allocating apparatus of claim 1, wherein the physical index converter allocates pilot subcarriers generated based on the pilot location constant with regular intervals with respect to the time axis and the frequency axis.

3. The subcarrier allocating apparatus of claim 2, wherein the intermediate index converter comprises:
    a first comparing unit comparing the logical index and a pilot location constant;

a mapping unit converting the logical index into an intermediate index through a mapping process based on a given operation; and a first multiplexing unit determining an intermediate index based on a comparison result of the first comparing unit.

4. The subcarrier allocating apparatus of claim 3, wherein the given operation is an operation for obtaining a quotient of dividing by eight.

5. The subcarrier allocating apparatus of claim 4, wherein the mapping unit comprises:
   a subtraction unit subtracting the pilot location constant from the logical index;
   a shift operator performing an operation for obtaining a quotient of dividing by 8 on a subtraction result of the subtraction unit; and
   an addition unit calculating the intermediate index by adding the quotient of the division and the logical index.

6. The subcarrier allocating apparatus of claim 5, wherein the shift operator implements the operation for obtaining the quotient of dividing by 8 using high-order bits of the logical index while excluding the three least significant bits of the logical index.

7. The subcarrier allocating apparatus of claim 5, wherein the first multiplexing unit selects the logical index as the intermediate index when the logical index is less than the pilot location constant, and selects an intermediate index converted by the mapping unit when the logical index is greater than the pilot location constant.

8. The subcarrier allocating apparatus of claim 4, wherein the physical index converter comprises:
   a second comparing unit comparing the number of data subcarriers on left and right sides of the null subcarrier and an intermediate index determined by the first multiplexing unit;
   a mapping unit generating a physical index by performing subtraction or addition on the intermediate index determined by the first multiplexing unit; and
   a second multiplexing unit determining a physical index from the physical index generated from the subtraction or addition according to a comparison result of the second comparing unit.

9. A method for allocating data to be transmitted to a plurality of orthogonal subcarriers in an orthogonal frequency division multiplexing (OFDM) system, the method comprising:
   a) mapping, by a subcarrier allocating apparatus, a data subcarrier into a logical index, the logical index being formed by data subcarriers only;
   b) generating, by the subcarrier allocating apparatus, an intermediate index by modular operating the logical index; and
   c) converting, by the subcarrier allocating apparatus, the intermediate index into a physical index by inserting a null subcarrier being inserted as a guard interval into the intermediate index, the physical index indicating a location of a substantial subcarrier within a symbol.

10. The method of claim 9, wherein b) comprises:
   b-1) comparing the generated logical index and a pilot location constant and
   b-2) determining an intermediate index according to a result of the comparison, and the generated logical index is used as an intermediate index when the generated logical index is less than the pilot location constant.

11. The method of claim 10, wherein b) further comprises:
   b-3) subtracting the pilot location constant from the logical index and calculating a quotient of dividing a result of the subtraction by 8, and the quotient calculated in b-3) is used as an intermediate index when the logical index is greater than a pilot location constant.

12. The method of claim 10, wherein c) comprises:
   adding/subtracting a given value to/from the intermediate index generated in b);
   comparing data subcarriers on left and right sides of the null subcarrier and the generated intermediate index; and
   determining a result of the subtraction or addition according to a comparison result.

13. The method of claim 9, wherein the method allocates pilot subcarriers in regular intervals on the time and frequency axes.

14. A subcarrier de-allocating apparatus de-allocating data allocated to a plurality of subcarriers in an orthogonal frequency division multiplexing (OFDM) system, the subcarrier de-allocating apparatus comprising:
   an intermediate index generator generating an intermediate index by removing null subcarriers used as a guard interval from a current physical index, the physical index indicating a location of a substantial subcarrier within a symbol; and
   a logical index unit obtaining a substantial logical index by distinguishing a data subcarrier and a pilot subcarrier through a given operation, the logical index being formed by data subcarriers.

15. The subcarrier de-allocating apparatus of claim 14, wherein the given operation is an operation that divides a result of subtracting a pilot location constant from the intermediate index by nine.

16. The subcarrier de-allocating apparatus of claim 15, wherein the logical index unit distinguishes the data subcarrier and the pilot subcarrier based on a remainder of the division by nine.

17. The subcarrier de-allocating apparatus of claim 16, wherein the logical index unit distinguishes the order of a pilot subcarrier based on a quotient of the division by 9 when a current subcarrier is the pilot subcarrier.

18. The subcarrier de-allocating apparatus of claim 14, wherein, when pilot subcarriers are separated by 9 subcarriers and a 1K FFT is used, the logical index unit performs division by nine in the following equation:

(Ti−K)mod9=not[sign(0)]×48+not[sign(1)]×24+not[sign(2)]×12+not[sign(3)]×6+not[sign(4)]×3+not[sign(5)]×2+sign(5)×not[sign(6)]

where sign( )enotes the number of pilot subcarriers on left and right sides of a subcarrier to be converted into a logical index.

19. The subcarrier de-allocating apparatus of claim 18, wherein multiplication in the above equation is performed by a multiplexer.

20. A subcarrier de-allocating method for de-allocating data transmitting data from a plurality of subcarriers in an orthogonal frequency division multiplexing (OFDM), the method comprising:

a) determining, by a subcarrier de-allocating apparatus, an effective subcarrier using an intermediate index generated by removing a null subcarrier from a current physical index which indicates a location of a substantial subcarrier within a symbol;

b) obtaining, by a subcarrier de-allocating apparatus, the number of pilot subcarriers on left and right sides of the effective subcarrier; and c) obtaining, by the subcarrier de-allocating apparatus, a substantial logical index from the intermediate index by performing a given operation based on the number of pilot subcarriers obtained in b).

21. The subcarrier de-allocating method of claim 20, wherein the given operation is an operation that divides a result of subtracting a pilot location constant from the intermediate index by nine.

22. The subcarrier de-allocating method of claim 20, wherein in c), a pilot subcarrier and a data subcarrier are distinguished based on a remainder of dividing a result of subtracting a pilot location constant from the intermediate index by nine.

23. The subcarrier de-allocating method of claim 22, wherein when a current subcarrier is a pilot subcarrier, a location of the pilot subcarrier is obtained based on a quotient of dividing a result of subtracting a pilot location constant from the intermediate index by nine.

* * * * *